United States Patent
Rheinlander et al.

[11] Patent Number: 5,863,064
[45] Date of Patent: Jan. 26, 1999

[54] SKIN FOR AUTOMOTIVE AIR BAG COVER PANEL FORMED BY CASTING DIFFERENT PLASTIC MATERIALS

[75] Inventors: Fred Rheinlander, Rochester Hills, Mich.; Richard D. Rhodes, Jr., Somersworth, N.H.

[73] Assignee: Textron Autmotive Company Inc., Troy, Mich.

[21] Appl. No.: 911,527

[22] Filed: Aug. 14, 1997

[51] Int. Cl.$^6$ .................................................. B60R 21/20
[52] U.S. Cl. ........................................ 280/732; 280/728.3
[58] Field of Search ............................. 280/732, 728.3, 280/728.1, 743.1

[56] References Cited

U.S. PATENT DOCUMENTS

| | | |
|---|---|---|
| 3,504,063 | 3/1970 | Lemelson . |
| 4,246,213 | 1/1981 | Takamatsu et al. . |
| 4,463,046 | 7/1984 | Hutchison et al. . |
| 4,886,630 | 12/1989 | Sugiura et al. . |
| 4,895,389 | 1/1990 | Pack, Jr. . |
| 5,072,967 | 12/1991 | Batchelder et al. . |
| 5,145,444 | 9/1992 | Nelson . |
| 5,288,103 | 2/1994 | Parker et al. . |
| 5,316,822 | 5/1994 | Nishijima et al. . |
| 5,333,901 | 8/1994 | Barnes ..................................... 289/732 |
| 5,372,379 | 12/1994 | Parker ................................... 280/728.3 |
| 5,437,470 | 8/1995 | Terai et al. ............................ 280/728.3 |
| 5,567,375 | 10/1996 | Filion et al. .............................. 264/251 |
| 5,590,903 | 1/1997 | Philion et al. ........................ 280/728.3 |
| 5,804,121 | 9/1998 | Gallagher ................................ 264/250 |

*Primary Examiner*—Christopher P. Ellis
*Attorney, Agent, or Firm*—Reising, Ethington, Learman & McCulloch PLLC

[57] ABSTRACT

A skin for an automotive interior panel has a main body portion for covering most of the panel and an air bag cover portion for covering the panel portion that the air bag deploys through. Casting a first plastic material against a first portion of a heated mold surface forms the main body skin portion. Casting or spraying a plastic material against a second portion of the heated mold surface forms the air bag cover skin portion. The mold surface portions may be confined from one another by a partition or by masking one portion while casting against the other. The main body and air bag cover skin portions include adjacent edges that extend along the air bag cover portion periphery. The two skin portions are joined together along their adjacent edges while still on the heated mold. An air bag deployment tear seam is formed by first casting a tear seam gap in the cover portion then spraying or casting a relatively weaker material into the gap. Alternatively, a heated engraving tool or laser may be used to form a tear seam groove in the back side of the air bag cover skin portion, or a cutter device may open the cover upon air bag deployment.

51 Claims, 5 Drawing Sheets

SKIN FOR AUTOMOTIVE AIR BAG COVER PANEL FORMED BY CASTING DIFFERENT PLASTIC MATERIALS

TECHNICAL FIELD

This invention relates to plastic automotive interior skins and air bag cover skins and, more particularly, to a combination of the two.

BACKGROUND OF THE INVENTION

In manufacturing automotive interior panels that include air bag deployment portions, it is common practice to use vinyl, typically polyvinyl chloride (PVC), to form a thin soft pliable outer shell or skin for the panel. The skin material may also include the use of urethanes (e.g., PU) olefins (e.g., PP, PE, TPO, ETP-TPO), esters (e.g., COPE), styrenes (e.g., ADS, ASA) and rubbers (e.g. TPO, ETP-TPO, ABS) in various compositions. One side of a soft plastic foam layer is then bonded to the skin and the other side of the foam layer is bonded to an injection-molded plastic substrate. The substrate may also be constructed from materials such as metal, plastic composite or wood fiber composite using other forming techniques well known in the art. The skin, including its air bag cover portion, is commonly formed by casting or spraying plastic material against a heated mold surface that defines the desired shape of the appearance side of the panel. Two examples of materials that may be used in casting shells include miniature spherical (0.020") pellets formed by extruding plastic through a very small die, and a powder formed by using a high intensity mixer to diffuse plasticizer and colorant into PVC resin particles to yield a particle size averaging 300 microns. The mold is commonly referred to as a shell tool and typically has an electroformed nickel surface that produces a grained surface or other desired texture on the outer side of the skin for styling purposes.

It is also common practice to provide a tear seam in the air bag cover portion of the skin that air bag inflation force tears open to allow the air bag to deploy. The tear seam may be formed in various ways in the air bag cover skin such as with a visible weakening groove in the outer side, a hidden weakening groove in the back side or with a tear seam strip of relatively weak plastic material that is incorporated in the cover skin and may be hidden from view by painting the air bag cover. The opening for the air bag in the cover skin may also be formed by a cutting device located behind the skin. The substrate also includes suitable means, such as a hinged door arrangement; to create an opening in the substrate corresponding to the opening created in the cover skin. Upon air bag deployment a portion of the skin and a portion of the foam layer become the outer and intermediate layers, respectively, of such a door or doors and swing outward with the door or doors.

Certain polyvinyl chloride (PVC) formulations such as Drysol compounds DL1011 and DL1013 are well suited, in durability, fade and heat resistance, to meeting the general requirements of an instrument panel skin which is subject to sun rays passing through a proprietary formulations of PVC resins, plasticizers, stabilizers and pigments. Their formulations may include, but are not limited to the following: 50 to 60% PVC resin by weight, 30 to 45% plasticizer by weight, and 0.1 to 5% pigment by weight. On the other hand, the air bag cover requirements further include the ability to remain ductile at very low temperatures to prevent the cover from fragmenting when an inflating air bag impacts it. Because of cold embrittlement, PVC formulations such as DL1011 and DL1013 cannot provide for satisfactory air bag deployment performance. These PVC formulations tend to fragment at the extremely low temperatures that some automobile manufacturers specify. This is particularly true where a tear seam is formed in the skin or a cutter device is used to create an air bag deployment opening. To meet such extreme low temperature ductility requirements, a completely separate air bag door of PVC or other plastic materials may be installed in the instrument panel to obviate the need to tear or cut the PVC skin of the instrument panel to create an opening for the air bag. However, some automobile manufacturers prefer a hidden door. A completely separate air bag door is both difficult to hide and costs more than a skin having an integral tear seam that is either visible or hidden.

Certain PVC formulations such as Drysol compound DL3020, and certain polyurethane (PU) elastomers remain elastic or ductile at temperatures substantially below where PVC formulations such as Drysol compounds DL1011 or DL1013 become brittle or inelastic. However, PU and DL3020 are relatively expensive compared to DL1011 and DL1013. DL3020, for example, costs about 50% more than DL1013. In other words, standard PVC formulations such as Drysol compounds DL1011 and DL1013 are very well suited to general instrument panel skin requirements and are cheaper than PU and DL3020, but are not as ductile as PU or DL3020 at extremely low temperatures. There have been various attempts to cost-effectively meet the different instrument panel and air bag cover requirements with a single skin structure. However, it has proven to be especially difficult to cost-effectively design an instrument panel with satisfactory air bag deployment characteristics at extremely low temperatures.

SUMMARY OF THE INVENTION

The present invention provides a very cost-effective way to meet the differing requirements of an instrument panel skin and an air bag cover panel skin by forming a single plastic air bag cover panel skin from different polymeric materials. In particular, the present invention provides a way to meet the extreme low temperature requirements of the air bag deployment portion of an air bag cover panel skin by using a relatively inexpensive first plastic material to form a main body skin portion that covers most of the panel and using a second plastic material to form an air bag cover skin portion that is incorporated in the main body skin portion.

According to the invention, the main body skin portion comprises a skin casting made of a first plastic material and the air bag cover skin portion comprises a skin casting made of a second plastic material. The second plastic material has the property of remaining substantially more ductile with decreasing temperature than the first plastic material. A plastic bond, which may comprise a third plastic material or an overlap of the first and second plastic materials, attaches the main body skin portion to the air bag cover skin portion. An air bag deployment region is disposed centrally in the air bag cover skin portion adjacent the air bag deployment portion of the panel and is remote from the main body skin portion. The air bag deployment region is adapted to open in response to the force of an inflating air bag.

According to another aspect of the present invention the first plastic material is preferably a polyvinyl chloride (PVC) material and the second plastic material is preferably polyurethane (PU). Alternatively, the second plastic material may be a second PVC material.

According to another aspect of the present invention the backside of the air bag deployment region of the air bag cover skin portion may include a tear seam-defining groove. Alternatively, the air bag deployment region of the air bag cover skin may include an integral tear seam strip. The tear seam strip may comprise a combination of a weakening filler material with either PU or PVC—depending on which material is more suitable of use with the material comprising the airbag cover skin portion. Either combination will make the tear seam strip substantially weaker than the rest of the air bag cover skin portion.

According to another aspect of the present invention a method is provided for forming A skin for an automotive interior panel where the skin comprises a main body skin portion for covering most of an outer surface of the panel and an air bag cover skin portion bordered by the main body skin portion for covering the air bag deployment portion of the air bag cover panel. The main body skin portion is formed by casting a first plastic material against a first surface area of a heated shell tool to form a first plastic skin casting to the desired shape of the main body skin portion. The air bag cover skin portion is formed by casting or spraying a second plastic material against at least a second surface area of the heated shell tool to form a second plastic skin casting to the desired shape of the air bag cover skin portion.

The steps of forming the main body skin portion and forming the air bag cover skin portion may be performed simultaneously by confining the second surface area from the first surface area and simultaneously casting the first and second plastic materials against the respective confined first and second surface areas. Alternatively, the step of casting the main body skin portion may be performed sequentially before the step of casting or spraying the air bag cover skin portion by first masking-off the second surface area of the shell tool then casting the first plastic material against the first surface area, unmasking the second surface area, then casting or spraying the second plastic material against the second surface area The second plastic material may also be cast or sprayed against the layer of plastic material on the first surface area, or a portion thereof, to create a material overlap.

According to another aspect of the present invention where simultaneous casting of the first and second plastic materials against the respective confined first and second surface areas is performed, a bond is formed that attaches the main body skin portion and the air bag cover skin portion together along their respective inner and outer edges while the skin portions remain on the heated shell tool. The bond may be formed by spraying a plastic bonding material between, or between and overlapping, the inner edge of the main body skin portion and the outer edge of the air bag cover skin portion. Alternatively, where the step of casting the main body skin portion is performed sequentially before the step of casting or spraying the air bag cover skin portion, the bond preferably is created by an overlap of the first and second plastic materials.

According to another aspect of the present invention where a plastic bonding material must be used to join the first and second plastic materials, the bonding material must be of a form and composition capable of adequately bonding to both first and second materials as well known in the art. Preferably, the form of the material as applied is either that of a powder or liquid, which may be, applied though a conventional spray gun or spray apparatus. The plastic material(s) contained in either the powders or liquids may be of a completely thermoplastic nature or may contain a chemically reactive component, which makes them partially or completely thermoset after cure. In the instance of initially liquid bonding materials, the plastic bonding material may or may not be required to be in solution (either aqueous or non-aqueous), in order to make the plastic bonding material capable of being sprayed. Examples of preferable plastic bonding materials include both powder and liquid vinyls and urethanes. In order to spray liquid PVC it typically must be provided in a non-aqueous solution. Conversely, sprayable reactive liquid urethanes are not necessarily required to be in solution given that the reactive components are normally liquids and capable of being sprayed.

The process may also include the step of forming a tear seam in the air bag cover skin portion. The tear seam may be formed by scoring the back side of the air bag cover skin portion with a laser beam or by pressing a heated impression tool into the back side of the air bag cover skin portion. Alternatively, the step of forming a tear seam may include casting the second plastic material about a tear seam gap-defining gasket. The second plastic material may consist of either polyurethane or a polyvinyl chloride. The gasket may have an X, H, C U or I shape and may be supported within a second powder box. The gasket is pressed against the second surface area to form the tear seam-defining gap in the air bag cover skin portion upon gasket removal. The gap is filled with a plastic material by spraying or casting the plastic material to form a tear seam strip in the plastic skin casting while this casting remains on the second surface area. The gap may be filled by spraying or casting the plastic material, which may consist of a polyvinyl chloride material or a polyurethane with a weakening filler material.

Finally, a coat of paint may be applied to cover an outer surface of both skin portions, the bond and the tear seam strip. The paint is applied to hide both the bond and the tear seam strip from view and to present a more aesthetically pleasing appearance.

Thus, to reduce cost, the air bag cover panel skin of the present invention is mainly formed with the relatively low cost first plastic material. And, unlike prior art air bag cover skins, only the air bag cover portion of the panel that is directly impacted by the air bag is covered with a relatively high cost material with superior low-temperature properties. The superior low temperature properties of the relatively high cost materials prevent them from fragmenting at low temperatures when the air bag inflates and breaks open the air bag cover skin portion. The invention limits the direct air bag impact zone to the air bag cover portion surrounding the air bag deployment opening. Therefore the main body skin portion is not subjected to air bag impact and is prevented from fracturing. Moreover, casting shell tools used to form an instrument panel shell or skin are normally electroformed with a grained surface to impart a certain desired grained texture to the entire appearance surface of the panel. Therefore, in the present invention, a stylist is provided with the opportunity to design the air bag cover skin portion with a textured surface that may either be the same as or distinctly different from that of the main body skin portion. A stylist may accomplish this by so texturing the different areas on the mold surface the skin portions are cast against.

These and other aspects and features of the present invention will become more apparent from the following description and drawings:

DETAILED DESCRIPTION OF THE PREFERRED EMBODIMENT

Figure 1:
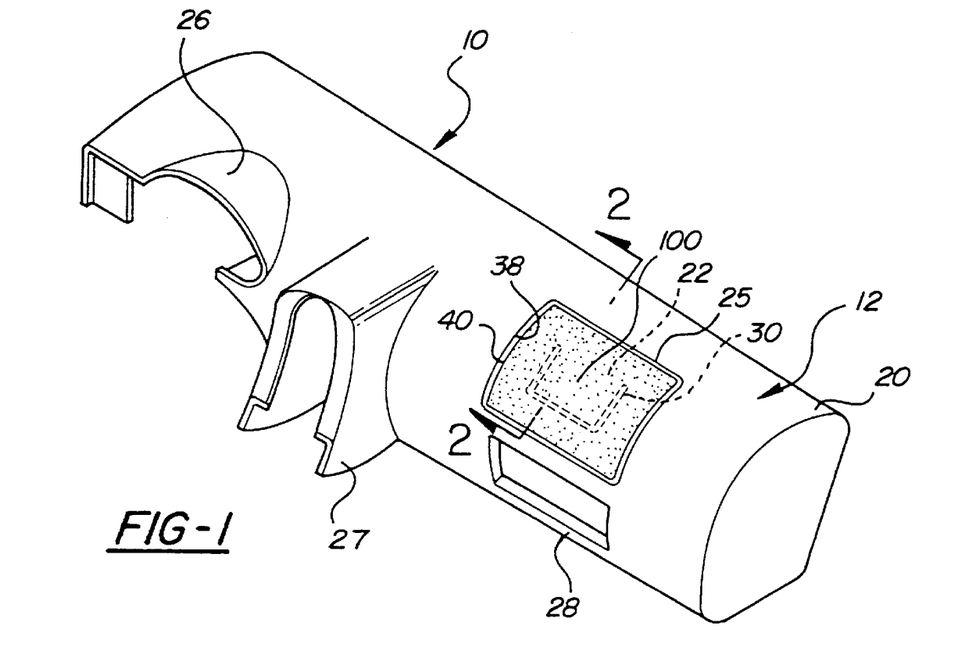
FIG. 1 is a perspective view of an automotive air bag cover panel having a skin according to the present invention.
Figure 2:
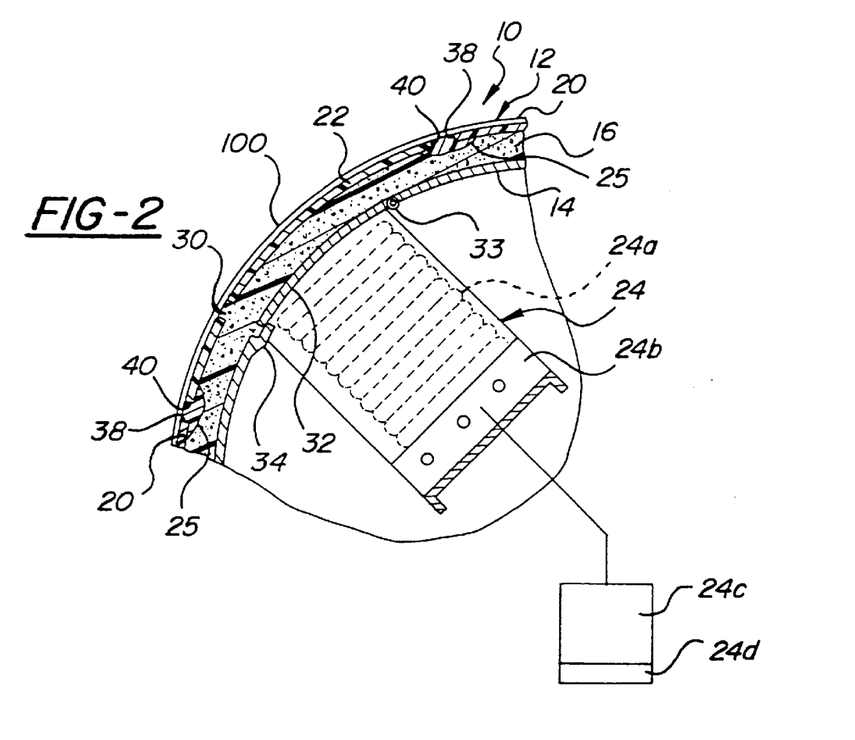
FIG. 2 is an enlarged view taken along the line 2—2 in FIG. 1 and includes a diagrammatic view of an air bag unit mounted behind the air bag cover portion of the panel.
Figure 3:
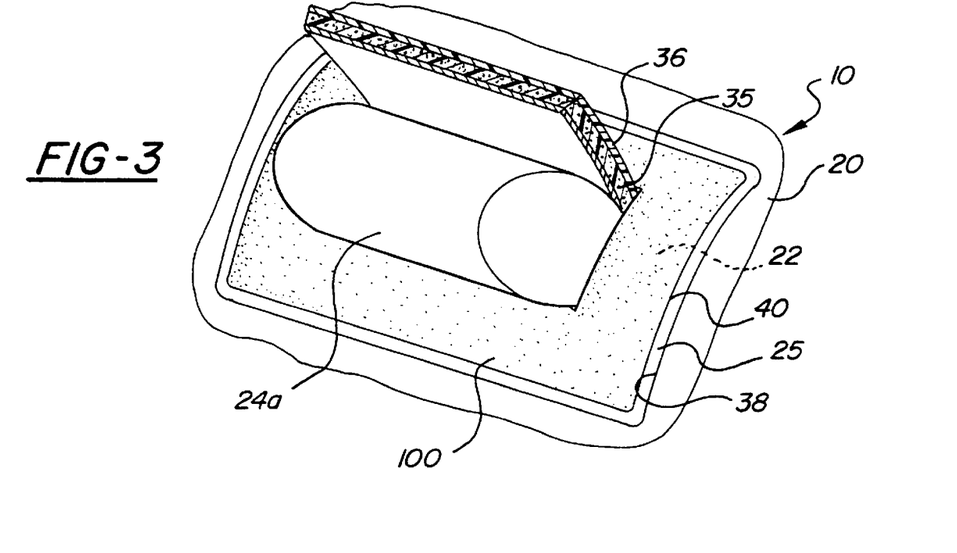
FIG. 3 is a perspective view illustrating air bag deployment through the air bag cover portion of the panel in FIG. 1.

FIGS. 1–3 illustrate an automotive instrument panel 10 comprising a soft, thin, pliable shell or skin 12, a substantially rigid substrate 14 and a soft foam backing layer 16 for the skin 12 that is bonded to both the skin 12 and substrate 14. The skin 12, foam 16, and substrate 14 may be bonded or joined together by any molding process known in the art, e.g., foam-in-place, vacuum forming, injection molding, compression molding, reaction injection molding, thermoforming, steam chest molding or blow molding. The substrate 14 supports the panel shape and allows it to attach to the forward end of a vehicle passenger compartment by various attaching portions (not shown) molded in the substrate 14. The substrate 14 is formed of a high strength plastic material and can be injection molded. For example, a suitable high strength injection moldable plastic such as Dow Pulse, ARCO Dylark, GE Noryl, can be used to form the substrate 14. Other materials that may be used to construct the substrate 14 include metal, plastic composite or wood fiber composite using other forming techniques well known in the art. The foam backing layer 16 is formed of a soft durable plastics foam material such as polyurethane foam, polyvinyl chloride foam, polyester foam, polystyrene foam, and polyolefin foam.

The skin 12 comprises a main body skin portion 20 and an air bag cover skin portion 22 made of a different plastic material better suited for the requirements of an air bag cover that must tear open as an air bag deploys through it. The main body skin portion 20 covers most of the instrument panel. The air bag cover skin portion 22 covers an air bag deployment portion of the instrument panel 10 on the passenger-side that covers an inflatable air bag system 24 and includes an air bag deployment door 32. The two skin portions 20, 22 are joined together by a plastic bond 25. The bonding material may or may not be the same material used to form the main body skin portion 20 or the air bag cover skin portion 22 or may be a composition of the two. The bonding material may be formed by overlapping and melt fusing the skin portions 20, 22 together, or may be applied separately as explained in greater detail below. Where the bonding material is applied separately, it must be of a form and composition capable of adequately bonding the main body and air bag cover portions 20, 22 of the skin 12 as is well known in the art. Preferable bonding materials include powder or liquid thermoplastic or thermoset compositions containing vinyls (typically PVC) or urethanes. Other bonding materials may include olefins, esters, styrenes and rubbers in various compositions.

The air bag system 24 is of a conventional type and includes an inflatable air bag 24A that is inflated by a gas generator 24B in response to a signal from a controller 24C with a collision sensing device 24D as is well known in the art.

The main body skin portion 20 is made of a first cast plastic material, e.g., a Drysol compound such as DL1011 or DL1013. DL1011 and DL1013 are Textron Automotive proprietary formulations of PVC resins, plasticizers, stabilizers and pigments. Their formulations include 50 to 60% PVC resin by weight, 30 to 45% plasticizer by weight and 0.1 to 5% pigment by weight. The glass transition temperature of DL1011 and DL1013, i.e., the temperature where DL1011 and DL1013 become brittle, is in the range of −50 to −55 degrees C.

The air bag cover skin portion 22 is made of a second cast plastic material that remains ductile at low temperatures substantially below where the first plastic material becomes brittle. The air bag cover skin portion 22 may, for example, comprise a polyurethane (PU) compound that may include a thermoplastic or thermoset aliphatic or aromatic compound. For example, U.S. patent application Ser. No. 08/319,614 discloses a suitable thermoplastic aliphatic compound and is incorporated herein by reference.

The main body and air bag cover skin portions 20, 22 may be formed simultaneously in a powder casting process as described in detail later. The main body portion 20 of the skin 12 covers most of the area of the panel 10 as mentioned above. The panel 10 includes an instrument cluster accommodating section 26, an accessories accommodating console section 27 and a glove box accommodating section 28. The instruments section 26 is located in a driver-side location on the panel for accommodating a cluster of instruments in front of a driver. The console section 27 is located in a central or intermediate location on the panel for accommodating various accessories such as temperature controls, a radio, etc. The glove box accommodating section 28 is located in a passenger-side location on the panel below the air bag cover portion of the panel covering the air bag 24A.

The air bag cover skin portion 22 is located in a passenger side location on the panel and has a generally rectangular shape that generally matches the shape of the air bag deployment portion of the panel 10. A centrally located, U-shaped hidden tear seam 30 is disposed in an air bag deployment region 31 of the air bag cover skin portion 22. When torn, the tear seam 30 forms a rectangular-shaped opening in the air bag cover skin portion 22 through which the air bag 24A can deploy into the passenger compartment in front of a passenger seated on that side.

The air bag deployment door 32 is disposed in the substrate 14 and allows the air bag to deploy through the panel structure from behind the air bag cover skin portion 22. The door 32 is connected to the main body of the substrate 14 by a hinge 33 and may be made of the same material as the substrate 14 as shown or a different material such as metal. The door 32 may be supported on a ledge 34 of the substrate 14 against inward movement to maintain the shape of the panel at this location and is directly impacted by the air bag 24A on inflation. The foam layer 16 may remain continuous at this location as shown or be provided with a separated section that is bonded to the inner side of the door 32 and the air bag cover skin portion 22 within the area the tear seam 30 encompasses.

The tear seam 30 is formed of a material that is substantially weaker than the air bag cover skin. portion 22 (i.e. has a lower tensile strength, tear strength, or percent elongation as measured at break), e.g., a polyurethane (PU) or PVC material with a weakening filler material that reduces the strength of the tear seam strip 30 to substantially less than that of the material forming the air bag cover skin portion 22. The tear seam 30 is adapted to be torn together with the foam layer 16 by the force of the inflating air bag 24A acting on the substrate door 32. A torn section 35 of the foam layer 16 and a torn section 36 of the cover skin portion 22 then swing outward with the hinged substrate door 32 to form a panel opening. The panel opening allows the inflating air bag 24A to deploy, as shown in FIG. 3, in a collision. Because the air bag deployment region 31 and tear seam 30 are located at or near the center of the air bag cover skin portion 22 and are therefore remote from the PVC main body skin portion 20, the force of the inflating air bag 24A cannot fragment the latter when the air bag deployment opening forms in the air bag cover skin portion 22.

As seen in FIGS. 1 and 2, the main body skin portion 20 and air bag cover skin portion 22 are cast with closely adjacent inner and outer edges 38 and 40, respectively, for the formation of the bond 25. The outer edge 40 defines the periphery of the air bag cover skin portion 22 and the inner edge 38 defines a border within the main body skin portion 20 surrounding the air bag cover skin portion 22.

Figure 5:
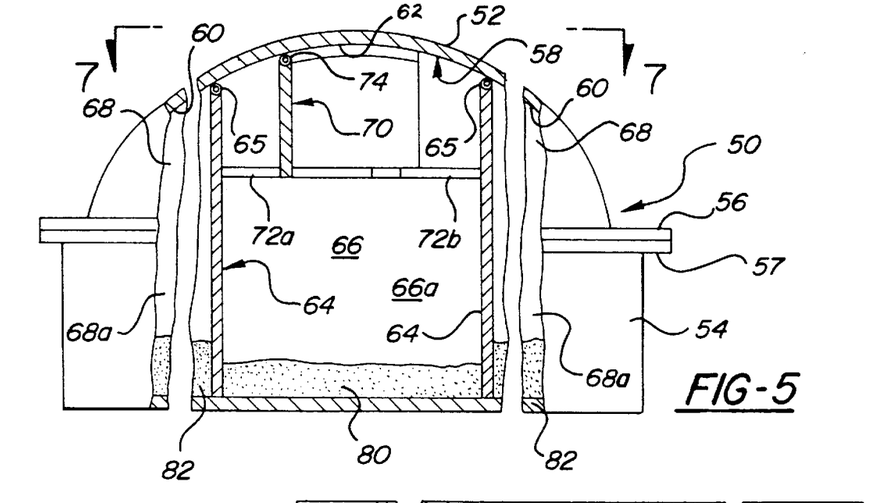
FIG. 5 is a diagrammatic partially cut-away front view with parts broken away of a shell mold and powder box apparatus for simultaneously casting both the main body skin portion and the air bag cover skin portion of the skin in FIG. 1.
Figures 6, 7:
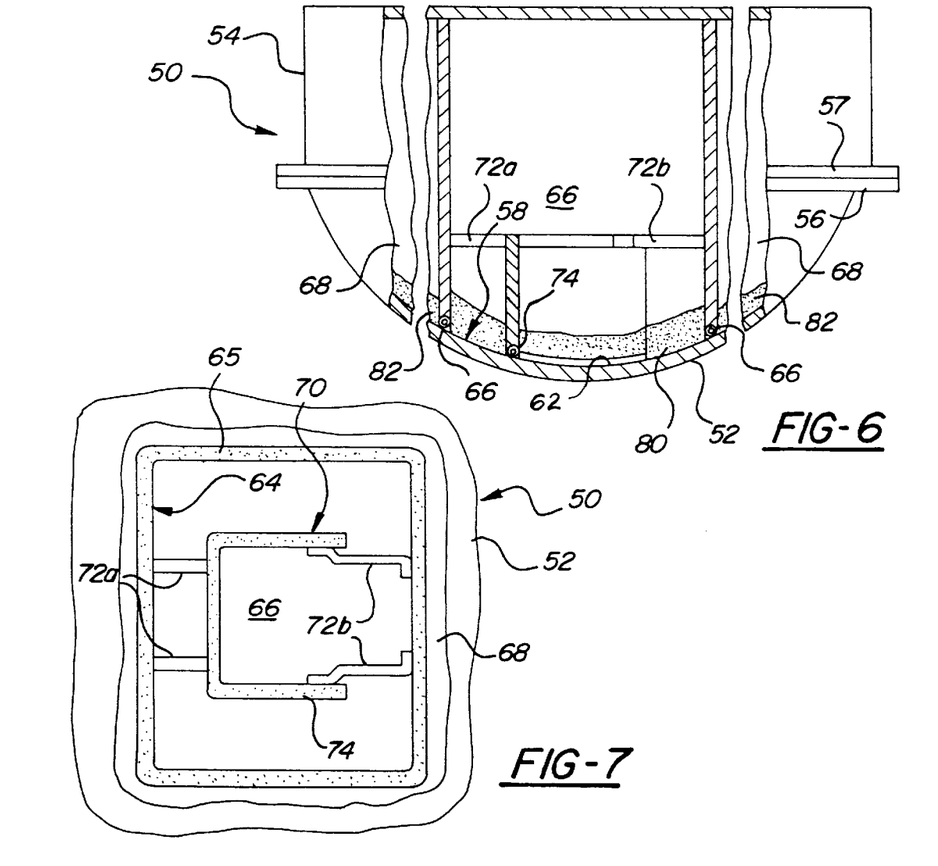
FIG. 6 is a view showing the apparatus in FIG. 5 inverted and illustrating the main body skin portion and the air bag cover skin portion of the skin being formed together on the shell mold.
FIG. 7 is a view taken along the line 7—7 in FIG. 5 with parts broken away.

The main body skin portion 20 and air bag cover skin portion 22 are cast in the same mold at the same time using the shell tool and powder box apparatus 50 shown in FIGS. 5, 6 and 7. A second embodiment of the powder box apparatus 50 having two separate powder boxes 54'A, 54'B is generally shown at 50' in FIGS. 11–14. Reference numerals with the designation prime (') in FIGS. 11–14 indicate alternative configurations of elements that also appear in the first embodiment. Where a portion of the following description uses a reference numeral to refer to the figures, if that reference numeral carries no prime designation, I intend that portion of the description to apply equally to elements indicated by primed numerals in FIGS. 11–14.

The apparatus 50 comprises a shell tool 52 and a partitioned powder box 54 having peripheral flanges 56 and 57, respectively, by which the shell tool 52 and powder box 54 are adapted to be connected together in sealed relationship about their periphery by suitable clamps in a well known manner. It should be understood that while the term "powder box" implies the use of a powdered form of material, the material form could also comprise that of pellets, beads, or liquid.

The shell tool 52 has an electroformed nickel mold surface generally designated as 58 that is formed in a well known manner and defines the desired shape of the entire skin 12 including the main body skin portion 20 and the air bag cover skin portion 22. These skin portions 20, 22 are formed on partitioned first 60 and second 62 surface area portions, respectively, of the shell tool mold surface 58. The shape of the main body skin portion 20 and/or the air bag cover skin portion 22 may include certain style lines. In this case the mold surface 58 is provided with features for forming the style lines in the outer side of the skin 12. The mold surface 58 is formed with a desired texture such as a grained texture that is imparted to the outer surface of the skin 12. The texture of the main body skin portion 20 and the air bag cover skin portion 22 can be made the same or different in electroforming the first 60 and second 62 mold surface area portions.

Inside the powder box 54 a temperature-resistant joint-defining gasket 65 is mounted on a joint pattern/partition 64. The joint pattern/partition 64 presses the joint-defining gasket 65 against the mold surface 58 to separate the powder box interior and shell tool 52 into two separate chambers 66 and 68 when the powder box 54 and shell tool 52 are clamped together. Partitioned sections 66A and 68A define these chambers in the mold box. The sections 66A, 68A are disposed on opposite sides of the joint pattern/partition 64 and are defined at the mold surface 58 by the respective first 60 and second 62 surface area portions of the shell tool 52. Referring to FIGS. 5 and 7, the joint-defining gasket 65 and at least the immediately supporting portion of the joint pattern/partition 64 are configured with the desired shape of the bonding joint 25 at the mold surface 58. This causes the joint-defining gasket 65 to define a joint boundary between the first 60 and second 62 mold surface portions and also prevents plastic material from depositing onto the mold surface area that it covers. This leaves a narrow gap between the inner 38 and outer 40 edges of the skin portions 20, 22. The bond 25 will later be formed in this narrow gap while the two skin portions 20, 22 remain on their respective mold surfaces 60, 62. The joint-defining gasket 65 can be a compressible temperature resistant foam or it can be a hollow gasket either of the inflatable or non-inflatable type as disclosed in U.S. Pat. No. 4,925,151.

The chamber 66 in the shell tool 52 and powder box assembly 54 is thus open only to the second surface area portion 62 of the shell tool 52 that defines the shape of the air bag cover skin portion 22 and its outer surface texture. The chamber 68 is thus open only to the first surface area portion 60 of the shell tool 52 that defines the shape of the main body skin portion 20 including any desired style lines as well as its outer surface texture. Referring again to FIGS. 5 and 7, a tear seam pattern 70 is mounted by supporting struts 72A and 72B on the interior side of the joint pattern/partition 64 in the partitioned section 66A of the powder box 54 that forms the chamber 66. The tear seam pattern 70 extends into the shell tool 52 to a position closely adjacent to the second mold surface area portion 62 when the powder box 54 and shell tool 52 are clamped together. A temperature-resistant tear seam-defining gasket 74 having the desired shape of the tear seam 30 is mounted on the pattern 70. The pattern 70 presses the tear seam-defining gasket 74 against the air bag cover skin mold surface 62 to form a narrow tear seam-defining gap when the plastic powder is cast against this surface to form the air bag cover skin portion 22 as described in more detail later. Similar to the joint-defining gasket 65, the tear seam-defining gasket 74 can be a compressible temperature resistant foam or it can be a hollow gasket either of the inflatable or non-inflatable type such as disclosed in the above U.S. Pat. No. 4,925,151.

A coat of paint may cover an outer surface of both the skin portions 20, 22, the bond 25 and the tear seam strip 30, hiding both the bond 25 and the tear seam strip 30 from view.

We intend the above description of the use of the skin 12 on an instrument panel to be illustrative and not limiting. In other embodiments, the skin 12 may be employed over any automotive panel or thin structure that an air bag deployment assembly is mounted behind, e.g., door panels, consoles, headliners, seats, pillars, other sidewall trim and package trays. In addition, instead of the hinged panel shown at 14 in FIGS. 2 and 4, the air bag deployment door may comprise a simple opening in the automotive panel, or any other means of forming or providing an air bag passageway or path. Instead of being made of urethane, the air bag cover portion 22 may be made of a PVC material, e.g., a Drysol compound such as DL 3020, having the property of remaining substantially more ductile with decreasing temperature than the first PVC material. DL3020 is made by Teknor Apex under the product designation code 93-A091C-59. DL3020 includes low temperature plasticizers such as azelates and trimellitates that yield a low glass transition temperature in the final polymer, i.e., from −60 to −70 degrees C. However, cost aside, PU compounds are generally preferred for use over PVC compounds given the plasticizer migration and associated loss of ductility from PVC over long periods of time. PU compounds are also preferred because they generally tend to have a wider temperature performance range than PVCs, at both high and low temperatures. In other embodiments, instead of, or in addition to being made of PU or PVC, the air bag cover portion 22 composition may include other vinyls, olefins (e.g., PP, PE, TPO, ETP-TPO), esters (e.g., COPE), styrenes (e.g., ABS, ASA), and rubbers (e.g. TPO, ETP-TPO, ABS).

As an additional alternative, the air bag cover portion 22 may be formed from a plastic material, which is applied by spraying.

In other embodiments, instead of, or in addition to being made of PVC, the main body skin composition may include other vinyls, urethanes (e.g., PU) olefins (e.g., PP, PE, TPO, ETP-TPO), esters (e.g., COPE), styrenes (e.g., ABS, ASA), and rubbers (e.g. TPO, ETP-TPO, ABS).

Figure 4:
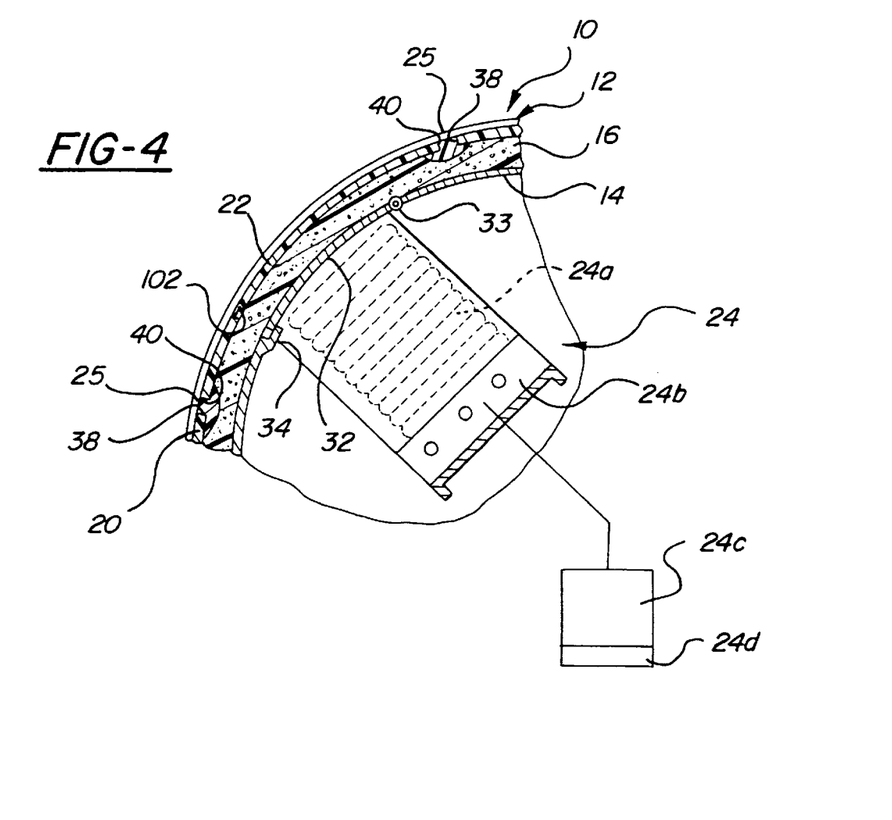
FIG. 4 is a view like FIG. 2 but showing a different form of tear seam.
Figure 10:
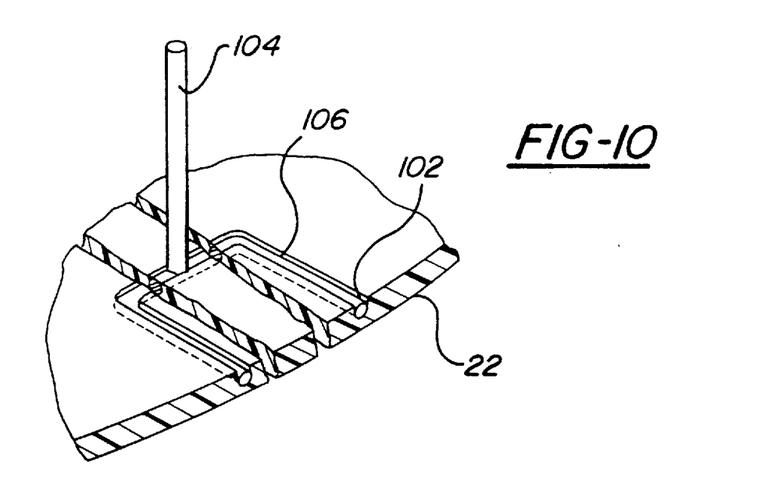
FIG. 10 is a diagrammatic view showing the hidden tear seam in FIG. 4 being formed in the air bag cover skin portion following the casting of the latter.

Other embodiments may also include a tear seam pattern 70 with an X, H, I or C-shape rather than a U-shape. These tear seam patterns may be defined by an integral tear seam strip 30 disposed in the air bag deployment region 31 of the air bag cover skin portion 22 or, as shown in FIGS. 4 and 10, a groove 102 in the back side of the air bag cover skin portion 22. Instead of comprising a PU material with a weakening filler material, the tear seam strip 30 may instead comprise a "weakened" thermoplastic PVC material, e.g., Drysol compound DL3021, which will reduce the strength of the tear seam strip 30 to substantially less than that of the second thermoplastic PVC material. DL3021 is a blend of 80% DL3020 by weight and 20% filler material by weight. In other embodiments, instead of, or in addition to being made of PU or PVC, the tear seam strip 30 composition may include other vinyls, olefins (e.g., PP, PE, TPO, ETP-TPO), esters (e.g., COPE), styrenes (e.g., ABS, ASA), and rubbers (e.g. TPO, ETP-TPO, ABS).

A process for manufacturing the skin 12 for the air bag cover panel includes initially removing the powder box 54 from the shell tool 52 and depositing a charge 80 of powder in the bottom of the partitioned section 66A of the powder box 54 that forms the chamber 66 and a charge 82 of the first plastic material in the bottom of the partitioned section 68A of the powder box 54 that forms the other chamber 68. The charged powder box 54 and the shell tool 52 are then joined as shown in FIG. 5 and the shell tool 52 is heated to a sufficient temperature to cause approximately one millimeter of the two dry powders 80, 82 to attach and fuse to the shape of the mold surface portions 60 and 62 when these powders are cast against these surfaces. The shell tool 52 is heated to this temperature in a well-known manner such as by circulating heated air across its exterior.

The mold apparatus 50 is then rotated or inverted as a unit 180 degrees from the position shown in FIG. 5 to the position shown in FIG. 6 to dump or cast the first dry plastic material 82 against the first heated mold surface area portion 60 and at the same time deposit the second powder 80 on the second heated mold surface area portion 62. A layer of the two different powders forms across the surface of the respective mold surface portions 60 and 62 separated by the joint-defining gasket 65. In addition, the second powder layer 80 in the chamber 66 on the second mold surface portion 62 forms about the tear seam-defining gasket 74. The layer of the two different powders 80, 82 fuses from the heat of the mold surface 58 to the desired thickness determined by the prescribed heat level of the shell tool 52 to form the main body skin portion 20 and the air bag cover skin portion 22. The two cast skin portions 20, 22 are separated by the joint-defining gasket 65 which forms a narrow joint-defining gap 84 between the adjacent inner 38 and outer 40 skin-casting edges at the shell tool mold surface 58 (see FIG. 8). In addition, the layer of powder extending about the tear seam defining gasket 74 on the mold surface 62 in the chamber 66 fuses to form a narrow tear seam-defining gap 86 in the cover skin casting following removal of this gasket (see FIG. 9).

Figure 8:
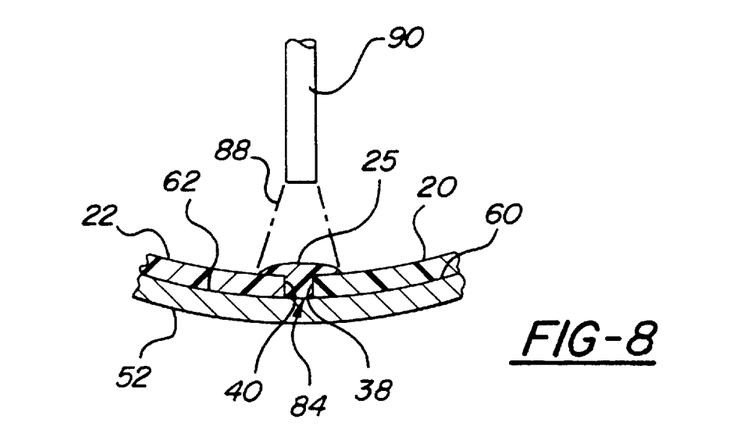
FIG. 8 is a diagrammatic view illustrating the main body skin portion and the air bag cover skin portion being bonded together on the shell tool following their casting.

Following fusing, the remaining powder 80, 82 is dumped back into the powder box 54 by rotating the apparatus 50 as a unit back to its initial position and the powder box 54 with the gaskets 65 and 74 and the joint pattern/partition 64, with the tear seam pattern 70 attached, is then separated from the shell tool 52. The shell tool 52 alone is then inverted again, as shown in FIG. 8, with the fused skin portions 20 and 22 remaining on the shell tool 52. The bonding material 88 is then sprayed from a nozzle 90 into the gap 84 between the main body skin portion inner edge 38 and the air bag cover skin portion outer edge 40. The bonding material 88 fills the gap 84 and preferably covers the margins on the backside of these skin portions 20, 22 bordering the gap 84. This forms a bond 25 to connect these skin portions 20, 22 together while they are still on the shell tool 52.

Where the bonding material 88 is sprayed-on, it would preferably have a form and composition capable of adequately bonding to both the materials making up the main body skin portion 20 and the airbag cover skin portion 22. Typically, the bonding material 88 would include either the material making up the main body skin portion 20, the airbag cover skin portion 22, or both, given the proposition that similar materials generally bond to themselves. Preferably, the form of the material as applied is either that of a powder or liquid, which may be, applied though a conventional spray gun or spray apparatus. The plastic material(s) contained in either the powders or liquids may be of a completely thermoplastic nature or may contain a chemically reactive component, which makes them partially, or completely thermoset after cure. In the instance of initially liquid bonding materials, the plastic bonding material may or may not be required to be in solution (either aqueous or non-aqueous), in order to make the plastic bonding material capable of being sprayed. Examples of preferable plastic bonding materials include both powder and liquid vinyls and urethanes. In order to spray liquid PVC it typically must be provided in a non-aqueous solution. Conversely, sprayable reactive liquid urethanes are not necessarily required to be in solution given that the reactive components are normally liquids and capable of being sprayed. Other bonding materials may include olefins, esters, styrenes and rubbers in various compositions.

Figure 9:
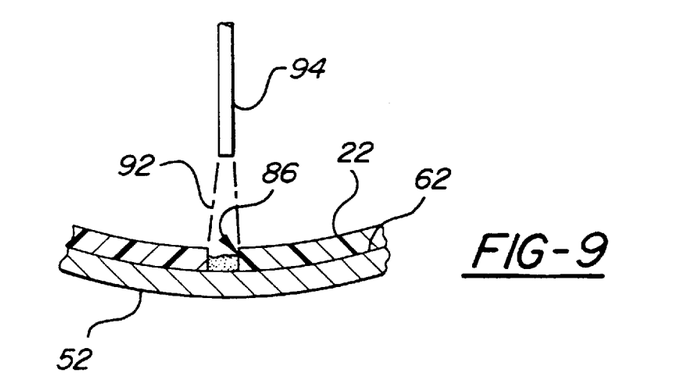
FIG. 9 is a diagrammatic view illustrating the tear seam strip in FIGS. 1 and 2 being formed on the shell tool in the tear seam defining gap in the air bag cover skin portion following the casting of the latter.

A relatively weak material 92 is also then applied from a nozzle 94 as shown in FIG. 9 to fill the gap 86 and form the tear seam 30 as an integral tear seam strip 30 in the air bag cover skin portion 22. While the tear seam strip 30 depicted in FIG. 9 does not overlap the main body skin portion 20 or the airbag cover skin portion 22, overlapping of the main body skin portion 20 and/or airbag cover skin portion 22 is also possible. Overlapping will promote adequate bonding through increased surface area. Preferably, the tear seam strip 30 is made of a material having low temperature ductility but with its strength sufficiently reduced so that it will tear with the force of air bag 24A inflation. Examples include PU or DL3020 sufficiently weakened by adding a weakening filler such as nepheline syenite with a medium particle size of about 3.9 microns and/or hollow silica-alumina microspheres with a median particle size of about 1.6 microns with the filler constituting about 60–80% of the tear seam material by weight. The addition of filler material weakens the compound by reducing the proportional amount of binder present in the compound. Examples of other weakened tear strip materials include various plastics such as olefins, esters, styrenes, and rubbers combined with fillers such as ceramics, minerals other plastics, or glass.

In distinct structural contrast, the bond 25 that joins the skin portions 20 and 22 has much greater strength. The bond 25 has sufficient strength to hold these different skin portions 20, 22 together and, in particular, to prevent the air bag force from separating the air bag cover skin portion 22 from the main body skin portion 20. However, in other embodiments, the bond 25, or a portion of the bond 25, and the tear seam 30 may be one and the same. According to such an alternative embodiment the composition of the bonding material 88 used for the bond 25 that joins skin portions 20 and 22 would be of a relatively weaker material. An example of this weaker material is the material 92 that would ordinarily be used to fill the gap 86 and form the tear seam 30 as an integral tear seam strip 30.

The shell tool 52 is further heated to suitably melt fuse and/or cure both the initially-deposited plastic skin materials 80, 82 and the later-added plastic bonding material 88 and tear seam material 92. Finally, the shell tool 52 is cooled and the skin 12 with its simultaneously cast main body skin portion 20 and air bag cover portion 22 bonded together by the bond 25 and with the inclusion of the tear seam 30 in the air bag cover skin portion 22 is removed as a single piece from the shell tool 52. Following removal from the shell tool, the skin 12 is then assembled in a well-known manner with the foam layer 16 and substrate 14 to complete the panel. At this time the tear seam 30 may be hidden from view by applying a coat 100 of suitable paint to the air bag cover skin portion 22 or the whole skin 12 may be painted to hide both the tear seam 30 and the joint bond 25 from view. Alternatively, the coat 100 of paint may be applied before assembly to the foam layer 16 and substrate 14.

The tear seam in the air bag cover skin casting 22 may also be formed as a hidden tear seam defining groove 102 in the back side of this skin casting as shown in FIGS. 4 and 10 thus eliminating any need to paint the air bag cover skin to hide the existence of a tear seam like the tear seam strip 30 in FIGS. 1–3. The tear seam defining groove 102 is formed with a heated impression tool or hot knife 104 as illustrated in FIG. 10 wherein the tool has a pattern 106 having the desired configuration of the tear seam and is formed with a rounded knife edge that is pressed against the cover skin casting to melt the plastic and form the groove to the desired depth. Alternatively, the knife-edge may be sharp (not shown). The hidden groove may also be formed by scoring with a laser or suitable cutting apparatus rather than a heated impression tool. The groove may also be formed as disclosed in U.S. Pat. No. 5,072,967, assigned to the assignee of the present invention and incorporated herein by reference.

The air bag cover skin casting 22 may be left devoid of any tear seam and a suitable cutter may instead be mounted in a position to form the air bag deployment opening in the air bag cover skin portion 22 upon air bag inflation. In this case the cutter is operated by the force of the inflating air bag 24A to cut an opening in the central region of the air bag cover skin portion 22. For example, the cutter disclosed in U.S. Pat. No. 5,108,128, which is hereby incorporated by reference, could be used in the panel construction to form the air bag deployment opening in the air bag cover skin portion 22. These and other suitable methods of weakening the skin to form tear seams are described in detail in U.S. Pat. Nos. 5,256,354; 5,288,103; 5,443,777; 5,154,444; 5,131,678; 5,222,760; 5,035,444; 5,072,967; 5,108,128 and 5,092,208; assigned to the assignee of the present invention and incorporated herein by reference.

Figures 11, 12, 13, 14:
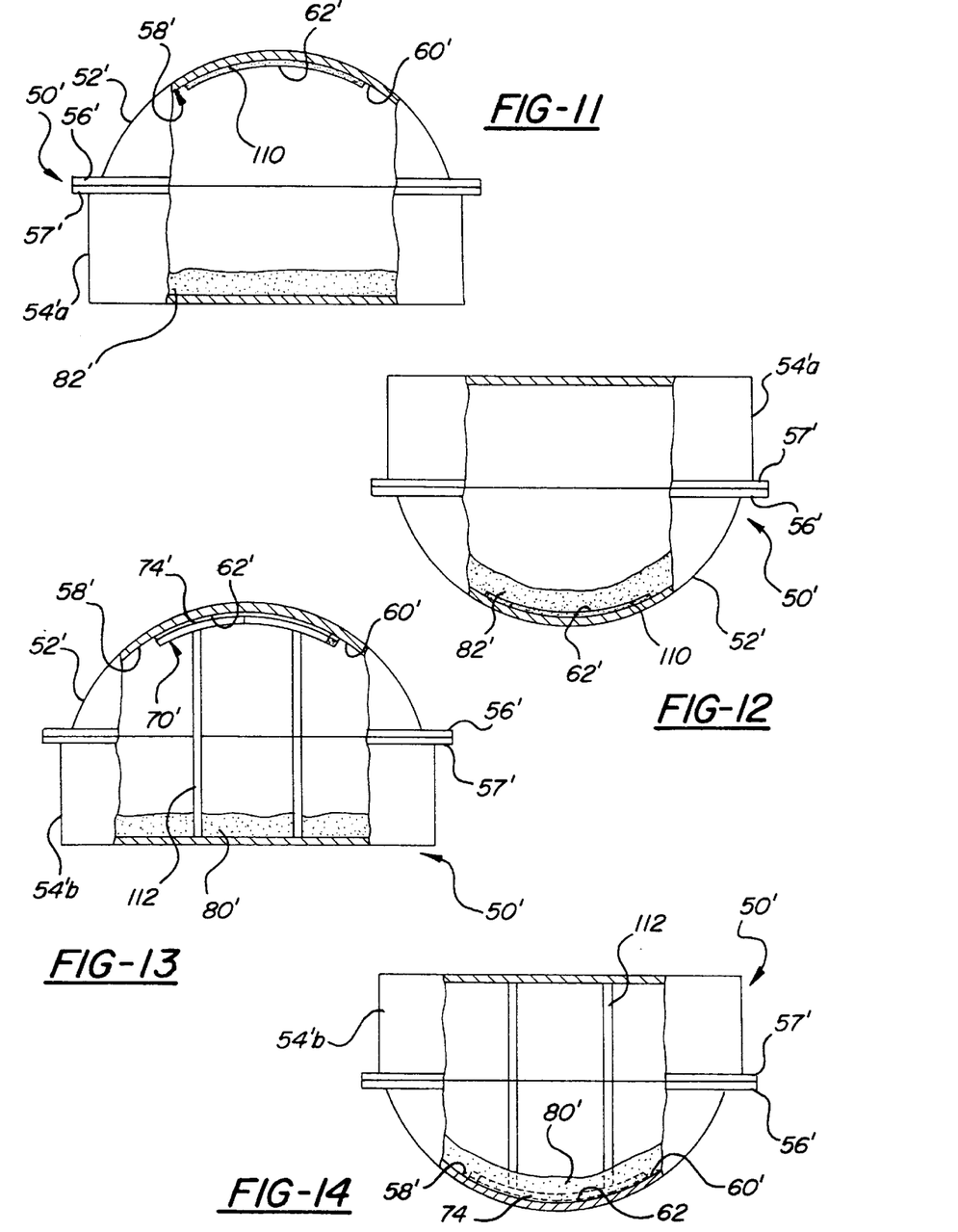
FIG. 11 is a diagrammatic partially cutaway front view of a second shell mold assembly with a first powder box attached for casting a first plastic material to form the main body skin portion of the skin in FIG. 1.
FIG. 12 is a view showing the apparatus in FIG. 11 inverted and illustrating the first plastic material skin casting being formed on the shell mold.
FIG. 13 is a diagrammatic partially cutaway front view of the second shell mold assembly with a second powder box attached for casting a second plastic material or for spraying a material to form the air bag cover skin portion of the skin in FIG. 1.
FIG. 14 is a view showing the apparatus in FIG. 13 inverted and illustrating the second plastic skin casting being formed on the shell mold.

FIGS. 11–14 show a second embodiment of the shell tool apparatus 50' used to manufacture a skin according to a second process. In this second process, instead of casting the main body skin portion 20 and air bag cover skin portion 22 at the same time from the same powder box 54, the main body skin portion 20 may be cast first—before casting the air bag cover skin portion 22. The second surface area portion 62' of the shell tool 52' is first masked-off with a silicone or pinular insulator 110 as shown in FIG. 11. A first material 82' is then cast from a first powder box 54'A against the first surface area portion 60' as shown in FIG. 12. The second surface area portion 62' is then unmasked as shown in FIG. 13, and a second material 80' is cast from a second powder box 54'B against the second surface area portion 62' as shown in FIG. 14. The second material 80' may also be cast against the material 82' coating the first surface area portion 60' to form an overlap.

As shown in FIGS. 13 and 14 the second material is cast about an X-shaped tear seam-defining gasket 74' supported by an anvil 112 within the second powder box 54'B. The tear seam-defining gasket 74' may alternatively have either an H, I, C or U-shape. The tear seam-defining gasket 74' is pressed against the second surface area portion 62' when the second powder box 54'B is connected to the shell tool 52'. The tear seam-defining gap 86 in the air bag cover skin portion 22 is left vacant when the tear seam-defining gasket 74' is removed. A plastic material is then sprayed, cast or otherwise used to fill the gap 86 and forms a tear seam strip 30 in the plastic skin casting 12 while this casting remains on the second surface area portion 62'.

In another embodiment the second powder box 54'B may be eliminated and the second material 80' may be sprayed against the second surface area portion 62'. The second material 80' may also be sprayed against the material 82' coating the first surface area portion 60' to form an overlap. In this embodiment, the tear seam-defining gasket 74' may be supported on the shell tool apparatus 50' during spraying of the second material 80' and removed after spraying.

The description and drawings set forth presently preferred embodiments of the invention in an illustrative manner. The description uses terminology that we intend to describe these embodiments and not to limit the scope of the invention. Obviously, it is possible to make many modifications and variations of the present invention in light of the above teachings. Therefore, within the scope of the appended claims, the invention may be practiced otherwise than as the description and drawings specifically show and describe.

We claim:

1. A skin for an automotive interior panel, the interior panel including an air bag deployment portion; the skin comprising:

a main body skin portion adapted to cover at least a portion of the automotive interior panel surrounding the air bag deployment portion of the panel, the main body skin portion comprising a first plastic material;

an air bag cover skin portion adapted to cover the air bag deployment portion of the automotive interior panel, the air bag cover skin portion comprising a second plastic material having the property of remaining substantially more ductile with decreasing temperature than the first plastic material;

a bond attaching the main body skin portion to the air bag cover skin portion; and an air bag deployment region disposed within the air bag cover skin portion and adapted to open with the air bag deployment door in response to the force of an inflating air bag.

2. A skin for an automotive interior panel as defined in claim 1 wherein the bond includes a material selected from the group including urethane and vinyl.

3. A skin for an automotive interior panel as defined in claim 1 wherein at least a portion of the bond is a tear seam.

4. A skin for an automotive interior panel as defined in claim 2 wherein the bond includes a thermoset urethane.

5. A skin for an automotive interior panel as defined in claim 2 wherein the bond includes a thermoplastic urethane.

6. A skin for an automotive interior panel as defined in claim 2 wherein the bond includes polyvinyl chloride.

7. A skin for an automotive interior panel as defined in claim 1 wherein the bond includes a material selected from the group including olefins, esters, styrenes, and rubbers.

8. A skin for an automotive interior panel as defined in claim 1 wherein the bond is a composition including at least one of the first plastic material and the second plastic material.

9. A skin for an automotive interior panel as defined in claim 1 wherein the bond includes a composition of the first plastic material and the second plastic material.

10. A skin for an automotive interior panel as defined in claim 1 wherein the bond includes a thermoset plastic.

11. A skin for an automotive interior panel as defined in claim 1 wherein the bond includes a thermoplastic plastic.

12. A skin for an automotive interior panel as defined in claim 1 wherein the bond includes an overlap of the first plastic material and the second plastic material.

13. A skin for an automotive interior panel as defined in claim 1 wherein the air bag deployment region of the air bag cover skin portion has a back side and the air bag cover skin portion includes a tear seam defining groove in the back side.

14. A skin for an automotive interior panel as defined in claim 1 wherein the air bag deployment region of the air bag cover skin portion includes an integral tear seam strip.

15. A skin for an automotive interior panel as defined in claim 14 wherein the tear seam strip includes a weaker plastic material having substantially less strength than the second plastic material.

16. A skin for an automotive interior panel as defined in claim 14 wherein the tear seam strip includes a material selected from the group including urethane and vinyl.

17. A skin for an automotive interior panel as defined in claim 16 wherein the tear seam strip includes a thermoset urethane.

18. A skin for an automotive interior panel as defined in claim 16 wherein the tear seam strip includes a thermoplastic urethane.

19. A skin for an automotive interior panel as defined in claim 16 wherein the tear seam strip includes polyvinyl chloride.

20. A skin for an automotive interior panel as defined in claim 14 wherein the tear seam strip includes a material selected from the group including olefins, esters, styrenes, and rubbers.

21. A skin for an automotive interior panel as defined in claim 14 wherein the tear seam strip includes a thermoplastic material containing a filler.

22. A skin for an automotive interior panel as defined in claim 14 wherein the tear seam strip includes a thermoset material containing a filler.

23. A skin for an automotive interior panel as defined in claim 1 wherein the first plastic material includes a material selected from the group including urethane and vinyl.

24. A skin for an automotive interior panel as defined in claim 23 wherein the first plastic material includes a thermoset urethane.

25. A skin for an automotive interior panel as defined in claim 23 wherein the first plastic material includes a thermoplastic urethane.

26. A skin for an automotive interior panel as defined in claim 23 wherein the first plastic material includes polyvinyl chloride.

27. A skin for an automotive interior panel as defined in claim 1 wherein the first plastic material includes a material selected from the group including olefins, esters, styrenes, and rubbers.

28. A skin for an automotive interior panel as defined in claim 1 wherein the second plastic material includes a material selected from the group including urethane and vinyl.

29. A skin for an automotive interior panel as defined in claim 28 wherein the second plastic material includes a thermoset urethane.

30. A skin for an automotive interior panel as defined in claim 28 wherein the second plastic material includes a thermoplastic urethane.

31. A skin for an automotive interior panel as defined in claim 28 wherein the second plastic material includes polyvinyl chloride.

32. A skin for an automotive interior panel as defined in claim 1 wherein the second plastic material includes a material selected from the group including olefins, esters, styrenes, and rubbers.

33. A skin for an automotive interior panel as defined in claim 1 wherein the second plastic material includes a material substantially more ductile with decreasing temperature than the first plastic material.

34. A skin for an automotive interior panel as defined in claim 1 wherein the second plastic material includes a urethane thermoset compound.

35. A skin for an automotive interior panel as defined in claim 14 wherein a coat of paint covers an outer surface of both the skin portions and the bond and the tear seam strip.

36. A method of forming a skin for an automotive interior panel wherein the skin comprises a main body skin portion for covering most of an outer surface of the panel, and an air bag cover skin portion bordered by the main body skin portion for covering only an air bag deployment portion of the air bag cover panel, the method comprising the steps of:

forming the main body skin portion by casting a first plastic material against a first surface area of a heated shell tool to form a first plastic skin casting to the desired shape of the main body skin portion, and forming the air bag cover skin portion by casting a second plastic material against a second surface area of the heated shell tool bounded by the first surface area to form a second plastic skin casting to the desired shape of the air bag cover skin portion, and forming a bond attaching the main body skin portion and the air bag cover skin portion together while on the heated shell tool.

37. A method as defined in claim 36 wherein the step of forming the air bag cover skin portion includes the step of casting the air bag cover skin such that the air bag cover skin portion overlaps the first plastic skin casting.

38. A method as defined in claim 36 wherein the steps of forming the main body skin portion and forming the air bag cover skin portion are performed simultaneously by confining the second surface area from the first surface area and simultaneously casting the first and second plastic materials against the respective confined first and second surface areas.

39. A method as defined in claim 36 wherein the step of casting the main body skin portion is performed before the step of casting the air bag cover skin portion by first masking-off the second surface area of the shell tool, casting the first plastic material against the first surface area, unmasking the second surface area, then casting the second plastic material against the second surface area.

40. A method as defined in claim 36 wherein the step of forming the air bag cover skin portion includes the step of spraying plastic material on the second surface area.

41. A method as defined in claim 36 wherein the step of forming the bond includes the step of spraying a plastic bonding material at least between an inner edge of the first plastic skin and an outer edge of the second plastic skin that extends along and adjacent the inner edge of the first plastic skin.

42. A method as defined in claim 41 wherein the step of forming the bond includes the step of employing a thermoset plastic as the bonding material.

43. A method as defined in claim 42 wherein the step of forming the bond includes the step of including a urethane in the thermoset plastic bonding material.

44. A method as defined in claim 41 wherein the step of forming the bond includes the step of employing a thermoplastic plastic as the bonding material.

45. A method as defined in claim 36 wherein the step of forming a bond includes the step of melt fusing a plastic bonding material to an inner edge of the first plastic skin and an outer edge of the second plastic skin that extends along and adjacent the inner edge of the first plastic skin.

46. A method as defined in claim 36 wherein the step of forming a bond includes the step of melt fusing an overlap of the first plastic skin and the second plastic skin.

47. A method as defined in claim 36 further comprising the step of forming a tear seam in the air bag cover skin portion.

48. A method as defined in claim 47 wherein the tear seam is formed by scoring the backside of the air bag cover skin portion with a laser beam.

49. A method as defined in claim 47 wherein the tear seam is formed by pressing a heated impression tool into the backside of the air bag cover skin portion.

50. A method as defined in claim 47 wherein the step of forming a tear seam includes the step of casting the second plastic material about a tear seam gap-defining gasket pressed against the second surface area to form the tear seam-defining gap in the air bag cover skin portion upon gasket removal, and filling the gap with the third plastic material to form a tear seam strip in the plastic skin casting while this casting remains on the second surface area.

51. A method as defined in claim 47 further comprising the step of painting an outer surface of both the skin portions and the bond and the tear seam strip.

* * * * *